(12) United States Patent
Miwa et al.

(10) Patent No.: US 9,553,534 B2
(45) Date of Patent: Jan. 24, 2017

(54) ELECTRIC POWER TOOL

(71) Applicant: Panasonic Intellectual Property Management Co., Ltd., Osaka (JP)

(72) Inventors: Tatsuya Miwa, Mie (JP); Masaki Ikeda, Mie (JP); Naoki Tsuruta, Mie (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/631,935

(22) Filed: Feb. 26, 2015

(65) Prior Publication Data
US 2016/0079895 A1    Mar. 17, 2016

(30) Foreign Application Priority Data
Sep. 12, 2014 (JP) ................................. 2014-186471

(51) Int. Cl.
*H02P 1/00* (2006.01)
*H02P 7/28* (2016.01)
(Continued)

(52) U.S. Cl.
CPC . *H02P 7/28* (2013.01); *B25F 5/00* (2013.01); *H02K 7/145* (2013.01)

(58) Field of Classification Search
CPC ......... H02P 3/08; H02P 29/0088; H02P 29/02; H02H 7/0852; H02H 7/18
(Continued)

(56) References Cited

U.S. PATENT DOCUMENTS 6,170,241 B1 * 1/2001 Shibilski .............. H02H 7/0833
    318/434
6,388,426 B1 * 5/2002 Yokoo ................... H02J 7/0093
    320/130
(Continued)

FOREIGN PATENT DOCUMENTS

EP        2 505 316 A2    10/2012
JP         11-288744 A    10/1999
(Continued)

OTHER PUBLICATIONS

Extended European Search Report for corresponding European Application No. 15156870.6 dated Feb. 5, 2016.

*Primary Examiner* — Bentsu Ro
*Assistant Examiner* — Thai Dinh
(74) *Attorney, Agent, or Firm* — Renner, Otto, Boisselle & Sklar, LLP

(57) ABSTRACT

An electric power tool includes a drive source, a rechargeable battery that supplies power to the drive source, a voltage meter that measures voltage of the rechargeable battery, a temperature meter that measures temperature of the rechargeable battery, and a drive control unit that regulates the power supplied to the drive source from the rechargeable battery to drive the drive source. If the battery temperature measured by the temperature meter is lower than or equal to a predetermined temperature when the battery voltage measured by the voltage meter is lower than or equal to a predetermined voltage, the drive control unit drives the drive source differently from normal driving that is performed if the battery temperature is higher than the predetermined temperature when the battery voltage is higher than the predetermined voltage.

2 Claims, 1 Drawing Sheet

(51) Int. Cl.
*B25F 5/00* (2006.01)
*H02K 7/14* (2006.01)

(58) Field of Classification Search
USPC ............ 318/139, 400.08, 400.21, 455, 471,
479,318/504
See application file for complete search history.

(56) References Cited

U.S. PATENT DOCUMENTS

| | | | |
|---|---|---|---|
| 6,448,731 B1 * | 9/2002 | Miller | B62D 5/046 |
| | | | 318/488 |
| 6,455,186 B1 | 9/2002 | Moores, Jr. et al. | |
| 6,645,666 B1 | 11/2003 | Moores, Jr. et al. | |
| 7,492,124 B2 * | 2/2009 | Johnson | B25F 5/02 |
| | | | 320/107 |
| 8,084,981 B2 * | 12/2011 | Miwa | B25F 5/00 |
| | | | 318/445 |
| 8,344,675 B2 * | 1/2013 | Miwa | H02P 29/0061 |
| | | | 318/471 |
| 8,872,451 B2 * | 10/2014 | Ikeda | G01R 19/16542 |
| | | | 318/139 |
| 2002/0034682 A1 | 3/2002 | Moores, Jr. et al. | |
| 2002/0197527 A1 | 12/2002 | Moores, Jr. et al. | |
| 2003/0027037 A1 | 2/2003 | Moores, Jr. et al. | |
| 2004/0174138 A1 * | 9/2004 | Moores, Jr. et al. | |
| 2004/0175610 A1 | 9/2004 | Moores, Jr. et al. | |
| 2005/0073282 A1 | 4/2005 | Carrier et al. | |
| 2005/0077878 A1 | 4/2005 | Carrier et al. | |
| 2005/0202310 A1 | 9/2005 | Yahnker et al. | |
| 2006/0110656 A1 | 5/2006 | Moores, Jr. et al. | |
| 2008/0003491 A1 | 1/2008 | Yahnker et al. | |
| 2008/0102355 A1 | 5/2008 | Moores, Jr. et al. | |
| 2008/0180059 A1 | 7/2008 | Carrier et al. | |
| 2008/0203995 A1 | 8/2008 | Carrier et al. | |
| 2009/0146614 A1 | 6/2009 | Carrier et al. | |
| 2010/0181966 A1 | 7/2010 | Sakakibara | |
| 2011/0163701 A1 * | 7/2011 | Carrier | H01M 2/1022 |
| | | | 318/139 |
| 2012/0247796 A1 | 10/2012 | Mueller et al. | |
| 2012/0274245 A1 | 11/2012 | Takano et al. | |
| 2012/0293096 A1 * | 11/2012 | Mizoguchi | B25F 5/00 |
| | | | 318/139 |
| 2013/0293197 A1 | 11/2013 | Sakakibara | |
| 2014/0091644 A1 | 4/2014 | Wirnitzer et al. | |

FOREIGN PATENT DOCUMENTS

| | | |
|---|---|---|
| JP | 2007-520180 A | 7/2007 |
| JP | 2009-071976 A | 4/2009 |
| JP | 2013-211980 A | 10/2013 |
| JP | 2014-054703 A | 3/2014 |

* cited by examiner

ELECTRIC POWER TOOL

CROSS-REFERENCE TO RELATED APPLICATIONS

This application is based upon and claims the benefit of priority from prior Japanese Patent Application No. 2014-186471, filed on Sep. 12, 2014, the entire contents of which are incorporated herein by reference.

FIELD

The present invention relates to electric power tools.

BACKGROUND

An electric power tool, such as an electric screwdriver or an impact wrench, uses a battery pack (rechargeable battery) as a power source. This eliminates the need for an electric cord connected to an external power supply such as a commercial power supply. Further, the electric power tool may be used where there is no external power supply. Japanese Laid-Open Patent Publication No. 2014-54703 describes an example of an electric power tool.

The electric power tool includes a control unit provided with an undercut function that stops performing discharging when the battery voltage is low (e.g., 2.0 V/cell). However, when the temperature of the battery pack is low (e.g., 5° C. or lower), the discharge of a large amount of current would cause a large voltage drop. In such a case, if the electric power tool is used under a situation in which the load is large and the temperature is low, activation of a trigger switch would also cause the undercut function to become effective and stop the operation of the electric power tool. As a result, it is difficult for the user to acknowledge whether the electric power tool stopped operating due to the depletion of the battery capacity (undercut function) or due to a voltage drop in a low-temperature condition.

SUMMARY

It is an object of the present invention to provide an electric power tool that allows the user to acknowledge the operation of the electric power tool caused by a voltage drop in a low-temperature condition.

One aspect of the present invention is an electric power tool including a drive source, a rechargeable battery that supplies power to the drive source, a voltage meter that measures a battery voltage of the rechargeable battery, a temperature meter that measures a battery temperature of the rechargeable battery, and a drive control unit that regulates the power supplied to the drive source from the rechargeable battery to drive and control the drive source. The drive control unit is configured such that if the battery temperature measured by the temperature meter is lower than or equal to a predetermined temperature when the battery voltage measured by the voltage meter is lower than or equal to a predetermined voltage, the drive control unit drives and controls the drive source differently from normal driving that is performed if the battery temperature is higher than the predetermined temperature when the battery voltage is higher than the predetermined voltage.

The present invention provides an electric power tool that allows the user to acknowledge the operation of the electric power tool when a voltage drop occurs in a low-temperature condition.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE EMBODIMENTS

One embodiment of an electric power tool 10 will now be described.

Figure 1:
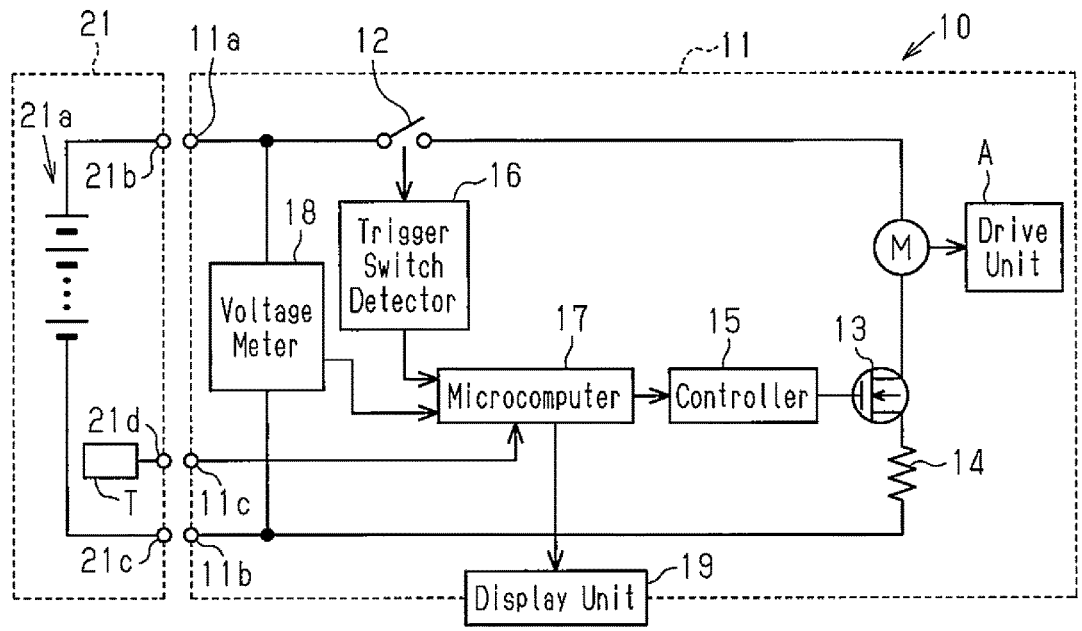
FIG. 1 is a schematic block diagram illustrating one embodiment of an electric power tool.

As illustrated in FIG. 1, the electric power tool 10 includes a main body 11 and a battery pack 21, which is coupled in a removable manner to the main body 11.

The main body 11 includes a motor M and a drive unit A. The motor M serves as a drive source and is driven by the drive source of the motor M. The drive unit A is, for example, a reduction drive and changes the rotation force, which is generated when the motor M is driven, to torque that is slow and high.

The main body 11 includes first and second input terminals 11a and 11b that are electrically connected to the battery pack 21. In the present embodiment, the first input terminal 11a is a positive terminal, and the second input terminal 11b is a negative terminal. The first input terminal 11a is connected to a first power terminal 21b of the battery pack 21. The second input terminal 11b is connected to a second power terminal 21c of the battery pack 21.

The first input terminal 11a is connected via a trigger switch 12 to one terminal of the motor M. The other terminal of the motor M is connected to the drain of an FET 13. The source of the FET 13 is connected to one end of a resistor 14. The gate of the FET 13 is connected to a controller 15. The other end of the resistor 14 is connected to the second input terminal 11b.

When activated by a user, the trigger switch 12 outputs an operation signal corresponding to an activation or deactivation command of the electric power tool 10 (motor M). The operation signal output from the trigger switch 12 is provided via a trigger switch detector 16 to a microcomputer 17. The microcomputer 17 provides the controller 15 with a control signal that is based on the operation signal. The controller 15 uses the FET 13 to control the power supplied to the motor M. In this manner, the controller 15 controls and drives the motor M. In the present embodiment, the microcomputer 17 and the controller 15 form a drive control unit.

The main body 11 includes a voltage meter 18, which is connected to the microcomputer 17 and which measures the battery voltage of the battery pack 21. Further, a display unit 19, which is formed by, for example, an LED indicator, is connected to the microcomputer 17. The display unit 19 is capable of indicating, for example, the state of charge of the battery pack 21. The main body 11 also includes a memory (not illustrated) that stores various thresholds used to switch the operation of the electric power tool 10 in accordance with the temperature, voltage, or the like of the battery pack. In the present embodiment, the stored thresholds include, for example, an undercut voltage Vs2, a predetermined voltage Vs1, and a predetermined temperature Ts. The undercut voltage Vs2, which is a reference voltage used to detect over-discharging of the rechargeable battery, is set to, for example, 2.0 V/cell. The predetermined voltage Vs1 is a reference voltage set to a higher value than the undercut voltage Vs2 and is used to detect the value to which the battery voltage may decrease when the battery temperature is low. The predetermined voltage Vs1 is set to, for example, 2.4 V/cell that is obtained by increasing the undercut voltage Vs by 20%. The predetermined temperature Ts, which is a reference temperature used to detect the battery temperature at which the battery voltage is apt to drop, is set to, for example, 5° C. The values of the voltages Vs1 and Vs2 and the temperature Ts are examples and may be changed in accordance with the specification of the like.

The battery pack 21 includes a rechargeable battery formed by battery cells 21a (e.g., lithium ion batteries). The rechargeable battery includes the first power terminal 21b, which serves as a positive terminal, and the second power terminal 21c, which serves as a negative terminal.

The battery pack 21 further includes a temperature meter T, which is electrically connected to the microcomputer 17 via the first terminal 21d of the battery pack 21 and a terminal 11c of the main body 11. The temperature meter T is, for example, a thermistor. The temperature meter T measures the temperature of the rechargeable battery (battery cells 21a) and provides the microcomputer 17 with temperature information indicating the measurement result.

One example of the operation of the electric power tool 10 will now be described.

When the user activates the trigger switch 12, the battery pack 21 supplies the motor M with power and drives the motor M. Drive force is transmitted from the motor M to the drive unit A. This rotates a bit or the like (not illustrated) attached to a chuck (not illustrated) of the drive unit A.

Figure 2A:
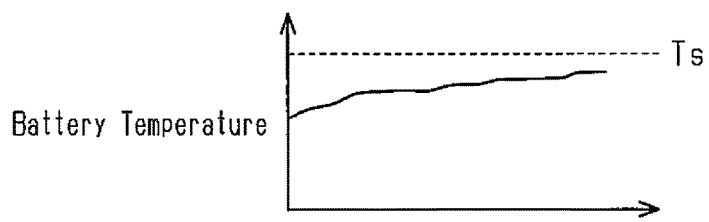
FIGS. 2A to 2C are timing charts illustrating an example of the operation of the electric power tool when the temperature is low.
Figure 2B:
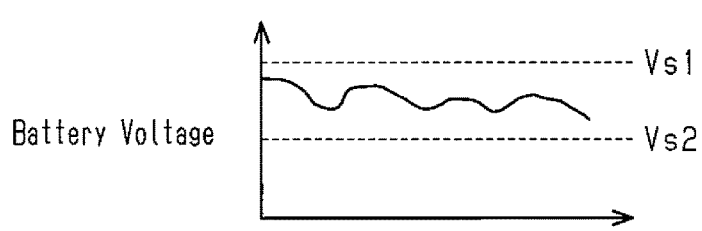
Figure 2C:
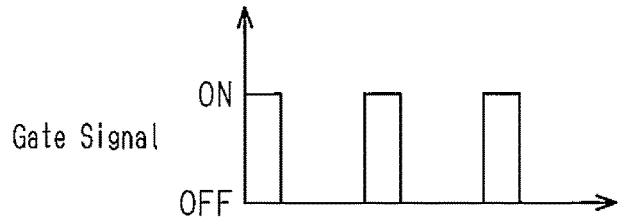

The microcomputer 17 monitors the temperature of the rechargeable battery (battery pack 21), which is measured by the temperature meter T, and the voltage of the rechargeable battery, which is measured by the voltage meter 18. Referring to FIGS. 2A to 2C, if the battery temperature is lower than or equal to the predetermined temperature Ts (e.g., 5° C.) when the battery voltage is lower than or equal to the predetermined voltage Vs1 (e.g., 2.4 V/cell), the controller 15 sets a gate signal provided to the FET 13 at an ON level in predetermined intervals to intermittently drive the motor M based on a control signal from the microcomputer 17. That is, if the battery temperature is lower than or equal to the predetermined temperature Ts when the battery voltage is lower than or equal to the predetermined voltage Vs1, the motor M is driven and controlled differently from normal driving that is performed if the battery temperature is higher than the predetermined temperature Ts when the battery voltage is higher than the predetermined voltage Vs1. If the battery temperature is higher than the predetermined temperature Ts when the battery temperature is lower than or equal to the undercut voltage Vs2 (e.g., 2.0 V/cell), the controller 15 deactivates the FET based on a control signal from the microcomputer 17 and stops the supply of power to the motor M. This limits over-discharging of the battery pack 21. In this manner, the motor M is driven and controlled so that the electric power tool 10 operates differently in accordance with the battery temperature and the battery voltage. This allows the user to distinguish the operation of the electric power tool 10 caused by a voltage drop when the temperature of the battery pack 21 is low from the operation of the electric power tool 10 when the battery capacity is depleted (undercut).

The present embodiment has the advantages described below.

(1) If the battery temperature, which is detected by the temperature meter T, is lower than or equal to the predetermined temperature Ts when the battery voltage, which is measured by the voltage meter 18, is lower than or equal to the predetermined voltage Vs1, the drive control unit (microcomputer 17 and controller 15 in the present example) drives and controls the motor M differently from normal driving that is performed if the battery temperature is higher than the predetermined temperature Ts when the battery voltage is higher than the predetermined voltage Vs1. This allows the user to acknowledge the operation of the electric power tool 10 resulting from a voltage drop when the battery temperature is low.

(2) The drive control unit (microcomputer 17 and controller 15 in the present example) intermittently drives the motor M so that the motor M is driven differently from the normal driving. This allows the user to acknowledge that the operation of the electric power tool 10 results from a voltage drop when the battery temperature is low, while reducing the supply of power from the battery pack 21.

(3) The drive control unit (microcomputer 17 and controller 15 in the present example) interrupts the supply of power to the motor M when the battery voltage is lower than or equal to the undercut voltage Vs2. This limits over-discharging of the battery pack 21.

It should be apparent to those skilled in the art that the present invention may be embodied in many other specific forms without departing from the spirit or scope of the invention. Particularly, it should be understood that the present invention may be embodied in the following forms.

In the above embodiment, the controller 15 and the microcomputer 17 intermittently drive the motor M if the battery temperature is lower than or equal to the predetermined temperature Ts when the battery voltage is less than or equal to the predetermined voltage Vs1. The intermittent driving may be performed by controlling the motor M in predetermined cycles or controlling the motor M in a non-cyclic manner.

In the above embodiment, the battery pack 21 (rechargeable battery) includes more than one battery cell 21a but may include only one battery cell 21a.

In the above embodiment, the battery pack 21 is coupled in a removable manner to the main body 11. However, the battery pack 21 may be fixed to the main body 11.

The above embodiment and the above modified examples may be combined with one another.

The present disclosure includes the embodiments described below.

Embodiment 1

An electric power tool (10) includes a drive source (M), a rechargeable battery (21) that supplies power to the drive source, a voltage meter (18) that measures a battery voltage of the rechargeable battery, a temperature meter (T) that measures a battery temperature of the rechargeable battery, and a drive control unit (15, 17) that regulates the power supplied to the drive source from the rechargeable battery to drive and control the drive source. If the battery temperature measured by the temperature meter is lower than or equal to a predetermined temperature (Ts) when the battery voltage measured by the voltage meter is lower than or equal to a predetermined voltage (Vs1), the drive control unit drives and controls the drive source differently from normal driving that is performed if the battery temperature is higher than the predetermined temperature when the battery voltage is higher than the predetermined voltage.

Embodiment 2

The drive control unit intermittently drives the drive source so that the drive source is driven differently from the normal driving.

Embodiment 3

The drive control unit interrupts the supply of power to the power source when the battery voltage is lower than or equal to an undercut voltage (Vs2) that is lower than the predetermined voltage.

The present examples and embodiments are to be considered as illustrative and not restrictive, and the invention is not to be limited to the details given herein, but may be modified within the scope and equivalence of the appended claims.

The invention claimed is:

1. An electric power tool comprising:
   a drive source;
   a rechargeable battery that supplies power to the drive source;
   a voltage meter that measures a battery voltage of the rechargeable battery;
   a temperature meter that measures a battery temperature of the rechargeable battery; and
   a drive control unit that regulates the power supplied to the drive source from the rechargeable battery to drive and control the drive source;
   wherein the drive control unit is configured such that if the battery temperature measured by the temperature meter is lower than or equal to a predetermined temperature when the battery voltage measured by the voltage meter is higher than an undercut voltage and is lower than or equal to a predetermined voltage, the drive control unit drives and controls the drive source differently from normal driving that is performed if the battery temperature is higher than the predetermined temperature when the battery voltage is higher than the predetermined voltage, and
   wherein the drive control unit interrupts the supply of power to the power source when the battery voltage is lower than or equal to the undercut voltage that is lower than the predetermined voltage.

2. The electric power tool according to claim 1, wherein the drive control unit intermittently drives the drive source so that the drive source is driven differently from the normal driving.

\* \* \* \* \*